(12) United States Patent
Bireley et al.

(10) Patent No.: US 9,715,438 B2
(45) Date of Patent: Jul. 25, 2017

(54) STATIC EXECUTION OF STATEMENTS IN A PROGRAM

(75) Inventors: William Robert Bireley, Morgan Hill, CA (US); Stephen Andrew Brodsky, Los Gatos, CA (US); Jaijeet Chakravorty, Union City, CA (US); Anshul Dawra, San Jose, CA (US); Swaminathan Gounder, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 3084 days.

(21) Appl. No.: 11/771,782

(22) Filed: Jun. 29, 2007

(65) Prior Publication Data
US 2009/0007138 A1    Jan. 1, 2009

(51) Int. Cl.
*G06F 11/34* (2006.01)
*G06F 17/30* (2006.01)
*G06F 21/52* (2013.01)

(52) U.S. Cl.
CPC .... *G06F 11/3414* (2013.01); *G06F 17/30474* (2013.01); *G06F 21/52* (2013.01)

(58) Field of Classification Search
CPC ........... G06F 11/3414; G06F 17/30474; G06F 21/52; G06F 21/125
USPC ........................................................ 707/723
See application file for complete search history.

(56) References Cited

U.S. PATENT DOCUMENTS

| | | | |
|---|---|---|---|
| 5,668,987 A * | 9/1997 | Schneider | |
| 6,115,703 A * | 9/2000 | Bireley et al. | 707/704 |
| 6,289,344 B1 * | 9/2001 | Braia | G06F 21/6218 |
| 6,321,235 B1 * | 11/2001 | Bird | G06F 17/30433 707/802 |
| 6,353,833 B1 * | 3/2002 | Bird et al. | |
| 6,446,062 B1 * | 9/2002 | Levine et al. | 707/690 |
| 6,735,594 B1 * | 5/2004 | Zimowski | G06F 17/3041 |
| 6,873,980 B2 * | 3/2005 | Young et al. | |
| 7,024,406 B1 * | 4/2006 | Kunisetty et al. | |
| 7,065,676 B1 * | 6/2006 | Lang | G11C 29/56 714/32 |
| 7,743,053 B2 * | 6/2010 | Al-Omari | G06F 17/3048 707/706 |

(Continued)

OTHER PUBLICATIONS

Eisenberg et al., "SQLJ—Part 1: SQL Routines using the Java Programming Language", SIGMOD Record, vol. 28, No. 4 Dec. 1999 pp. 58-63.*

(Continued)

*Primary Examiner* — Phuong Thao Cao
(74) *Attorney, Agent, or Firm* — Janaki K. Davda; Konrad, Raynes, Davda & Victor LLP

(57) ABSTRACT

Provided are techniques for static execution of statements. Information from an execution file that describes statements that have been bound to a database during a previous execution of those statements dynamically and describes metadata about the statements is loaded. While executing a program that includes statements, for each of the statements, it is determined whether that statement is bound to the database. In response to determining that the statement is bound to the database, the statement is executed statically using the loaded information. In response to determining that the statement is not bound to the database, the statement is executed dynamically.

18 Claims, 15 Drawing Sheets

(56) References Cited

U.S. PATENT DOCUMENTS

| | | |
|---|---|---|
| 2002/0087516 A1* | 7/2002 | Cras et al. .................... 707/2 |
| 2002/0198867 A1* | 12/2002 | Lohman ............ G06F 17/30469 |
| 2003/0220941 A1* | 11/2003 | Arnold et al. ................. 707/200 |
| 2004/0158556 A1* | 8/2004 | Dettinger et al. ................. 707/3 |
| 2004/0205180 A1* | 10/2004 | Srivastava et al. ........... 709/223 |
| 2005/0015356 A1* | 1/2005 | Ireland et al. ................... 707/1 |
| 2005/0050039 A1* | 3/2005 | Theobald et al. ................. 707/4 |
| 2005/0065921 A1* | 3/2005 | Hrle et al. ........................ 707/3 |
| 2005/0091238 A1* | 4/2005 | Zane ................. G06F 17/30421 |
| 2005/0149914 A1 | 7/2005 | Krapf et al. |
| 2005/0154765 A1* | 7/2005 | Seitz et al. ................. 707/104.1 |
| 2005/0182758 A1* | 8/2005 | Seitz et al. ........................ 707/3 |
| 2005/0262048 A1* | 11/2005 | Dettinger et al. ................. 707/3 |
| 2005/0262512 A1 | 11/2005 | Schmidt et al. |
| 2006/0074858 A1* | 4/2006 | Etzold ............... G06F 17/30451 |
| 2006/0200507 A1* | 9/2006 | Holenstein et al. .......... 707/204 |
| 2006/0271557 A1* | 11/2006 | Harward ................... G06F 9/52 |
| 2007/0022100 A1* | 1/2007 | Kitsuregawa ..... G06F 17/30433 |
| 2007/0055644 A1* | 3/2007 | Bernal ............. G06F 17/30474 |
| 2007/0083525 A1* | 4/2007 | Srivastava et al. ............ 707/10 |
| 2007/0136311 A1* | 6/2007 | Kasten et al. .................. 707/10 |
| 2008/0091646 A1* | 4/2008 | Al-Omari ........... G06F 17/3048 |
| 2008/0141003 A1* | 6/2008 | Baker et al. ................... 712/220 |
| 2008/0183684 A1* | 7/2008 | Bestgen et al. ................... 707/4 |
| 2008/0320013 A1* | 12/2008 | Bireley et al. ................ 707/100 |

OTHER PUBLICATIONS

Andersen, et al., JDBC 4.0 Specification, JSR 221, Sun Microsystems, Inc., Nov. 7, 2006.*

IBM Coproration, "IBM WebSphere InterChange Server: Map Development Guide", Version 4.3.0, Sep. 30, 2004, 552 pp.

HiT Software, Inc., "JDBC Connectivity for IBM DB2 for Linux, UNIX, Windows, z/Os", [online], © 2016 HiT Software, Inc. [Retrieved on Apr. 12, 2016]. Retrieved from the Internet at <URL: http://www.hitsw.com/products_services/jdbc/jdbc_connectivity. html> and available at <http://www.hitsw.com/products_services/jdbc.html>, Total 4 pp.

HiT Software, Inc., "Release Notes: HiT JDBC/DB2 v3 Release Notes", [online], © 2015 Hit Software, Inc. [Retrived on Apr. 12, 2016]. Retrieved from the Internet at <URL: http://www.hitsw.com/support/relnotes/jdbcdb2_v3-rn.html>, Total 10 pp.

IBM, "IBM Knowledge Center", [online], [Retrieved on Apr. 12, 2016]. Retrieved from the Internet at <URL: http://www.ibm.com/support/knowledgecenter/SSEPGG_9.1.0/welcome.html> and available at <http://publib.boulder.ibm.com/infocenter/db2luw/v9/index.jsp?topic=/com.ibm.db2.udb.apdv.cli.doc/doc/t0007316.htm>, Total 1 p.

* cited by examiner

```
package sptest;

import java.sql.*;
import java.util.*;
import java.io.*;
import java.math.BigDecimal;

import com.ibm.db2.jcc.DB2SystemMonitor;

public class StaticProfileTest3
{
  PreparedStatement pstmt = null;
  Connection conn = null;
  Statement stmt = null;
  ResultSet rs = null;
  int updtCount = 0;

// Use this URL at CAPTURE Time
  String URL = "jdbc:db2://gilera.torolab.ibm.com:25227/sample:useRowsetCursor=false;traceFile=C:/ibmsqljri/
  Static_Profiling/TEST/abc.txt;traceLevel=-1;deferPrepares=false;";
  String user="newton";
  String password = "*******";

String sqlStr = null;
  String driver = "com.ibm.db2.jcc.DB2Driver";

public static void main (String a[])
  {
    StaticProfileTest3 StaticProfileTest_o = new StaticProfileTest3();
    StaticProfileTest_o.runThis(a);
  }
  public void runThis(String[] a)
  {
    boolean ret = false;
    try
    {
    Class.forName(driver);
    conn = DriverManager.getConnection(URL,user,password);
    conn.setAutoCommit(false);
    com.ibm.db2.jcc.DB2Connection db2Conn = (com.ibm.db2.jcc.DB2Connection)conn;
    com.ibm.db2.jcc.DB2SystemMonitor sysMon = db2Conn.getDB2SystemMonitor();
    sysMon.enable(true);
    sysMon.start(DB2SystemMonitor.ACCUMULATE_TIMES);
    long t1 = System.currentTimeMillis();
    stmt = conn.createStatement();
    int var1 = 99;
    String var2 = "Row99";
    BigDecimal bd = new BigDecimal("99999.99");

System.out.println(" Connection Obtained Successfully...");
    System.out.println(" Execute an Insert Statement...");
    sqlStr = "INSERT INTO tab1 VALUES(?,?,?)";
```

FIG. 5A

```
pstmt = conn.prepareStatement(sqlStr);
pstmt.setInt(1, var1);
pstmt.setString(2, var2);
pstmt.setBigDecimal(3,bd);
updtCount = pstmt.executeUpdate();
System.out.println(" Insert succeeded update Count: " + updtCount);
pstmt.close();
System.out.println("");

System.out.println(" Execute a Searched Update Statement...");
sqlStr = "UPDATE tab1 set c1 = ?, c2 = ?, c3 =? WHERE c1 = ?";
pstmt = conn.prepareStatement(sqlStr);
var1 = 88;
var2 = "Row88";
bd = new BigDecimal("88888.88");
pstmt.setInt(1, var1);
pstmt.setString(2, var2);
pstmt.setBigDecimal(3,bd);
pstmt.setInt(4,99);
updtCount = pstmt.executeUpdate();
System.out.println(" Update succeeded update Count: " + updtCount);
pstmt.close();
System.out.println("");

System.out.println(" Execute a Delete Statement1 (Not a PreparedStatement)...");
sqlStr = "DELETE FROM  tab1  WHERE c1 = 1";
ret = stmt.execute(sqlStr);
System.out.println(" Delete stmt1 Where c1 = 1 succeeded return val: " + ret);
System.out.println("");

System.out.println(" Execute a Delete Statement2 (Not a PreparedStatement)...");
sqlStr = "DELETE    FROM tab1 \n" +
    " WHERE c1= 2";
ret = stmt.execute(sqlStr);
System.out.println(" Delete stmt1 Where c1 = 2 succeeded return val: " + ret);
stmt.close();
System.out.println("");

System.out.println(" Execute JDBC-2 Style Positioned Update Statement...");
sqlStr = "SELECT c1,c2,c3 from tab1 WHERE c1 >=1 and c1<=5";
stmt = conn.createStatement(java.sql.ResultSet.TYPE_SCROLL_SENSITIVE,
java.sql.ResultSet.CONCUR_UPDATABLE);
   rs = stmt.executeQuery (sqlStr);
   var1=2323;
   bd = new BigDecimal("2323.23");
   rs.absolute(1);
   rs.updateInt(1,var1 );
   rs.updateString(2, "3-updated");
   rs.updateBigDecimal(3,bd );
```

FIG. 5B

```
rs.updateRow();

rs.absolute(2);
rs.updateInt(1,2222 );
rs.updateRow();
rs.moveToInsertRow();
rs.updateInt(1,9999 );
rs.updateString(2, "InsertRow");
rs.updateBigDecimal(3, new BigDecimal("9999.99") );
rs.insertRow();
rs.moveToCurrentRow();

rs.absolute(3);
if (a.length > 0 && a[0].equalsIgnoreCase("delete"))
  rs.deleteRow();
stmt.close();
System.out.println(" JDBC2 Positioned Update/Delete succeeded " );
System.out.println("");

System.out.println(" Execute JDBC-1 Style Positioned Update Statement...");
sqlStr = "SELECT c1,c2,c3 from tab1 WHERE c1 =5 OR c1=6  FOR UPDATE";
//stmt = conn.createStatement(java.sql.ResultSet.TYPE_SCROLL_SENSITIVE,
java.sql.ResultSet.CONCUR_UPDATABLE);
PreparedStatement qpstmt = conn.prepareStatement(sqlStr);
rs = qpstmt.executeQuery ();
pstmt = conn.prepareStatement("UPDATE  tab1  SET c1=?, c2=?, c3=? WHERE CURRENT OF " +
rs.getCursorName());
  var1 =5657;
  bd = new BigDecimal("5656.56");
//rs.absolute(1);
rs.next();
pstmt.setInt(1,var1 );
pstmt.setString(2, "5-updated");
pstmt.setBigDecimal(3,bd );
ret =pstmt.execute();
//stmt.close();
ResultSet rs2 = qpstmt.executeQuery ();
pstmt.close();
System.out.println(" JDBC1 Positioned Update succeeded return val: " + ret );
System.out.println("");

pstmt = conn.prepareStatement ("SELECT * from tab1",
  java.sql.ResultSet.TYPE_SCROLL_SENSITIVE,
  java.sql.ResultSet.CONCUR_UPDATABLE);
pstmt.setCursorName ("mycur1");
java.sql.ResultSet rs1 = pstmt.executeQuery ();
rs1.next ();
```

```
String updateString = "update tab1 set c1 = 9999 where current of \"mycur1\"";
   java.sql.PreparedStatement ps1 = conn.prepareStatement (updateString);
   int updateCount = ps1.executeUpdate ();

System.out.println(" Execute A Normal Query...");
   sqlStr = "SELECT c1,c2,c3 from tab1 WHERE 1=1";
   pstmt = conn.prepareStatement(sqlStr);
   rs = pstmt.executeQuery();
   int count = 0;
   while(rs.next())
   {
   System.out.println(" ============================ ");
   System.out.println(" C1: " + rs.getInt(1) );
   System.out.println(" C2: " + rs.getString(2));
   System.out.println(" C3: " + rs.getBigDecimal(3) );
   System.out.println(" ============================ ");
   System.out.println("");
   count++;
   }
   System.out.println(" Total Rows: " + count);
   pstmt.close();
   System.out.println(" Normal Query succeeded... " );

sysMon.stop();
   long t2 = System.currentTimeMillis();
   System.out.println("Elapsed Time(currentTimeMillis): " + (t2-t1));
   System.out.println("Application Time Millis     : " + sysMon.getApplicationTimeMillis());
   System.out.println("Core Driver Time Micros     : " + sysMon.getCoreDriverTimeMicros() + "
seconds: " + sysMon.getCoreDriverTimeMicros()/Math.pow(10.0, 6.0));
   System.out.println("Network IO Time Micros      : " + sysMon.getNetworkIOTimeMicros() + "
seconds: " + sysMon.getNetworkIOTimeMicros()/Math.pow(10.0, 6.0));
   System.out.println("Server Time Micros          : " + sysMon.getServerTimeMicros()   + "seconds: "
+ sysMon.getServerTimeMicros()/Math.pow(10.0, 6.0));
   conn.rollback();
   conn.close();

}
   catch (Exception e)
   {
    System.out.println(" Exception Caught: " + e.getMessage());
    if (e instanceof SQLException)
    {
     System.out.println(" SQLCode: " + ((SQLException)e).getErrorCode());
    }
    e.printStackTrace();
   }
  }
 }
```

FIG. 5D

```xml
<?xml version="1.0" encoding="UTF-8" ?>
<CaptureRecord>
    <PkgInfo CollectionName="NULLID" ConToken="{0x56, 0x41,
    0x6b, 0x72, 0x4b, 0x43, 0x45, 0x58}"
    ConTokenStr="VAkrKCEX" RootPkgName="ABCD"
    UserBindOptions="COLLECTION NULLID SQLERROR
    CONTINUE" VERSION="" />
    <SQLStmtRecord CollationKey="-1827735034" NumParams="3"
        SectionNum="1" SqlStr="INSERT INTO tab1 VALUES
        (?,?,?)">
        <ParamMetaData>
            <ParamColMetaData CCSid="0" IsArray="false" Label=""
            Length="4" Name="p1" Nullable="true"
            ParamType="4" Precision="0" Scale="0"
            SqlxUpdatable="0" Type="497" />
            <ParamColMetaData CCSid="1208" IsArray="false"
            Label="" Length="10" Name="p2" Nullable="true"
            ParamType="1" Precision="0" Scale="0"
            SqlxUpdatable="0" Type="453" />
            <ParamColMetaData CCSid="0" IsArray="false" Label=""
            Length="0" Name="p3" Nullable="true"
            ParamType="3" Precision="10" Scale="2"
            SqlxUpdatable="0" Type="485" />
        </ParamMetaData>
    </SQLStmtRecord>
    <SQLStmtRecord CollationKey="1012542073" NumParams="4"
        SectionNum="2" SqlStr="UPDATE tab1 set c1 = ?, c2 = ?, c3
        = ? WHERE c1 = ?">
        <ParamMetaData>
            <ParamColMetaData CCSid="0" IsArray="false" Label=""
            Length="4" Name="p1" Nullable="true"
            ParamType="4" Precision="0" Scale="0"
            SqlxUpdatable="0" Type="497" />
            <ParamColMetaData CCSid="1208" IsArray="false"
            Label="" Length="10" Name="p2" Nullable="true"
            ParamType="1" Precision="0" Scale="0"
            SqlxUpdatable="0" Type="453" />
            <ParamColMetaData CCSid="0" IsArray="false" Label=""
            Length="0" Name="p3" Nullable="true"
            ParamType="3" Precision="10" Scale="2"
            SqlxUpdatable="0" Type="485" />
            <ParamColMetaData CCSid="0" IsArray="false" Label=""
            Length="4" Name="p4" Nullable="true"
            ParamType="4" Precision="0" Scale="0"
            SqlxUpdatable="0" Type="497" />
        </ParamMetaData>
```

```
</SQLStmtRecord>
<SQLStmtRecord Collation Key="-1897539006" SectionNum="3"
  SqlStr="DELETE FROM tab1 WHERE c1 = 1" />
<SQLStmtRecord Collation Key="177663691" SectionNum="4"
  SqlStr="DeLeTE FROM tab1 WHERE c1 = 2" />
- <SQLStmtRecord CollationKey="-1684040976"
   CurserAttrOnPrepare="SENSITIVE STATIC SCROLL FOR
   UPDATE"
   DynamicPosUpdateCursorName="SQL_CURSH200C1"
   NumRSCols="3"
   RSConcurrency="java.sql.ResultSet.CONCUR_UPDATEABLE"
   RSHoldability="java.sql.ResultSet.HOLD_CURSORS_OVER_COMMIT"
   RSType="java.sql.ResultSet.TYPE_SCROLL_SENSITIVE"
   SectionNum="5" SqlStr="SELECT c1,c2,c3 from tab1 WHERE
   c1 >=1 and c1<=5"
   StaticPosUpdateCursorName="DB2JCCCURSOR5"
   - <ResultSetMetaData>
       <RSColMetaData CCSid="0" IsArray="false" Label=""
          Length="4" Name="C1" Nullable="true"
          ParamType="4" Precision="0" Scale="0"
          SqlxUpdatable="1" Type="497" />
       <RSColMetaData CCSid="1208" IsArray="false" Label=""
          Length="10" Name="C2" Nullable="true"
          ParamType="1" Precision="0" Scale="0"
          SqlxUpdatable="1" Type="453" />
       <RSColMetaData CCSid="0" IsArray="false" Label=""
          Length="0" Name="C3" Nullable="true"
          ParamType="3" Precision="10" Scale="2"
          SqlxUpdatable="1" Type="485" />
   </ResultSetMetaData>
</SQLStmtRecord>
- <SQLStmtRecord CollationKey="1870819641"
   DynamicPosUpdateCursorName="SQL_CURSH200C1"
   NumParams="3" SectionNum="6" SqlStr="UPDATE
   "SAMPLE"."NEWTON"."TAB1", SET ("C1","C2","C3") =
   (?,?,?) WHERE CURRENT OF "SQL_CURSH200C1""
   StaticPosUpdateCursorName="DB3JCCCURSOR5"
   - <ParamMetaData>
       <ParamColMetaData CCSid="0" IsArray="false" Label=""
          Length="4" Name="p1" Nullable="true"
          ParamType="4" Precision="0" Scale="0"
          SqlxUpdatable="0" Type="497" />
       <ParamColMetaData CCSid="1208" IsArray="false"
          Label="" Length="10" Name="p2" Nullable="true"
          ParamType="1" Precision="0" Scale="0"
          SqlxUpdatable="0" Type="453" />
```

FIG. 6B

```xml
        <ParamColMetaData CCSid="0" IsArray="false" Label=""
            Length="0" Name="p3" Nullable="true"
            ParamType="3" Precision="10" Scale="2"
            SqlxUpdatable="0" Type="485" />
    </ParamMetaData>
</SQLStmtRecord>
<SQLStmtRecord CollationKey="1753899774"
    DynamicPosUpdateCursorName="SQL_CURSH200C1"
    NumParams="3" SectionNum="7" SqlStr="INSERT INTO
    "SAMPLE"."NEWTON"."TAB1"  (C1,C2,C3) VALUES (?,?,?)"
    StaticPosUpdateCursorName="DB2JCCCURSOR5">
    <ParamMetaData>
        <ParamColMetaData CCSid="0" IsArray="false" Label=""
            Length="4" Name="p1" Nullable="true"
            ParamType="4" Precision="0" Scale="0"
            SqlxUpdatable="0" Type="497" />
        <ParamColMetaData CCSid="1208" IsArray="false"
            Label="" Length="10" Name="p2" Nullable="true"
            ParamType="1" Precision="0" Scale="0"
            SqlxUpdatable="0" Type="453" />
        <ParamColMetaData CCSid="0" IsArray="false" Label=""
            Length="0" Name="p3" Nullable="true"
            ParamType="3" Precision="10" Scale="2"
            SqlxUpdatable="0" Type="485" />
    </ParamMetaData>
</SQLStmtRecord>
<SQLStmtRecord CollationKey="1551083173"
    DynamicPosUpdateCursorName="SQL_CURSH200C1"
    SectionNum="8" SqlStr="DELETE FROM
    "SAMPLE"."NEWTON"."TAB1"  WHERE CURRENT OF
    "SQL_CURSH200C1""
    StaticPosUpdateCursorName="DB2JCCCURSOR5" />
<SQLStmtRecord CollationKey="-1656864040"
    CurserAttrOnPrepare="FOR READ ONLY"
    DynamicPosUpdateCursorName="SQL_CURSH200C1"
    NumRSCols="3"
    RSConcurrency="java.sql.ResultSet.CONCUR_READ_ONLY"
    RSHoldability="java.sql.ResultSet.HOLD_CURSORS_OVER_COMMIT"
    RSType="java.sql.ResultSet.TYPE_FORWARD_ONLY"
    SectionNum="9" SqlStr="SELECT c1,c2,c3 from tab1 WHERE
    c1 =5 OR c1 =6 FOR UPDATE"
    StaticPosUpdateCursorName="DB2JCCCURSOR9">
    <ResultSetMetaData>
        <RSColMetaData CCSid="0" IsArray="false" Label=""
            Length="4" Name="C1" Nullable="true"
            ParamType="4" Precision="0" Scale="0"
```

```
            SqlxUpdatable="1" Type="497" />
         <RSColMetaData CCSid="1208" IsArray="false" Label=""
            Length="10" Name="C2" Nullable="true"
            ParamType="1" Precision="0" Scale="0"
            SqlxUpdatable="1" Type="453" />
         <RSColMetaData CCSid="0" IsArray="false" Label=""
            Length="0" Name="C3" Nullable="true"
            ParamType="3" Precision="10" Scale="2"
            SqlxUpdatable="1" Type="485" />
      </ResultSetMetaData>
   </SQLStmtRecord>
-  <SQLStmtRecord CollationKey="1871706397"
   DynamicPosUpdateCursorName="SQL_CURSH200C1"
   NumParams="3" SectionNum="10" SqlStr="UPDATE tab1 SET
   c1=?, c2=?, c3=? WHERE CURRENT OF
   "SQL_CURSH200C1""
   StaticPosUpdateCursorName="DB2JCCCURSOR9"
   -  <ParamMetaData>
         <ParamColMetaData CCSid="0" IsArray="false" Label=""
            Length="4" Name="p1" Nullable="true"
            ParamType="4" Precision="0" Scale="0"
            SqlxUpdatable="0" Type="497" />
         <ParamColMetaData CCSid="1208" IsArray="false"
            Label="" Length="10" Name="p2" Nullable="true"
            ParamType="1" Precision="0" Scale="0"
            SqlxUpdatable="0" Type="453" />
         <ParamColMetaData CCSid="0" IsArray="false" Label=""
            Length="0" Name="p3" Nullable="true"
            ParamType="3" Precision="10" Scale="2"
            SqlxUpdatable="0" Type="485" />
      </ParamMetaData>
   </SQLStmtRecord>
   <SQLStmtRecord CollationKey="-2138717110"
   CurserAttrOnPrepare="SENSITIVE STATIC SCROLL FOR
   UPDATE" DynamicPosUpdateCursorName="mycur1"
   NumRSCols="3"
   RSConcurrency="java.sql.ResultSet.CONCUR_UPDATABLE"
   RSHoldability="java.sql.ResultSet.HOLD_CURSORS_OVER_COMMIT"
   RSType="java.sql.ResultSet.TYPE_SCROLL_SENSITIVE"
   SectionNum="11" SqlStr="SELECT * from tab1"
   StaticPosUpdateCursorName="DB2JCCCURSOR11"
   -  <ResultSetMetaData>
         <RSColMetaData CCSid="0" IsArray="false" Label=""
            Length="4" Name="C1" Nullable="true"
            ParamType="4" Precision="0" Scale="0"
            SqlxUpdatable="1" Type="497" />
```

FIG. 6D

```
        <RSColMetaData CCSid="1208" IsArray="false" Label=""
          Length="10" Name="C2" Nullable="true"
          ParamType="1" Precision="0" Scale="0"
          SqlxUpdatable="1" Type="453" />
        <RSColMetaData CCSid="0" IsArray="false" Label=""
          Length="0" Name="C3" Nullable="true"
          ParamType="3" Precision="10" Scale="2"
          SqlxUpdatable="1" Type="485" />
      </ResultSetMetaData>
    </SQLStmtRecord>
<SQLStmtRecord CollationKey="138441038"
    DynamicPosUpdateCursorName="mycur1" SectionNum="12"
    SqlStr="update tab1 set c1 = 9999 WHERE CURRENT OF
    "mycur1""
    StaticPosUpdateCursorName="DB2JCCCURSOR11" />
- <SQLStmtRecord CollationKey="1306540070"
    CurserAttrOnPrepare="FOR READ ONLY" NumRSCols="3"
    RSConcurrency="java.sql.ResultSet.CONCUR_READ_ONLY"
    RSHoldability="java.sql.ResultSet.HOLD_CURSORS_OVER_COMMIT"
    RSType="java.sql.ResultSet.TYPE_FORWARD_ONLY"
    SectionNum="13" SqlStr="SELECT c1,c2,c3 from tab1
    WHERE 1=1"
  - <ResultSetMetaData>
      <RSColMetaData CCSid="0" IsArray="false" Label=""
        Length="4" Name="C1" Nullable="true"
        ParamType="4" Precision="0" Scale="0"
        SqlxUpdatable="0" Type="497" />
      <RSColMetaData CCSid="1208" IsArray="false" Label=""
        Length="10" Name="C2" Nullable="true"
        ParamType="1" Precision="0" Scale="0"
        SqlxUpdatable="0" Type="453" />
      <RSColMetaData CCSid="0" IsArray="false" Label=""
        Length="0" Name="C3" Nullable="true"
        ParamType="3" Precision="10" Scale="2"
        SqlxUpdatable="0" Type="485" />
    </ResultSetMetaData>
  </SQLStmtRecord>
</CaptureRecord>
```

FIG. 6E

STATIC EXECUTION OF STATEMENTS IN A PROGRAM

BACKGROUND

1. Field

Embodiments of the invention relate to static execution of statements in a program.

2. Description of the Related Art

Relational DataBase Management System (RDBMS) software may use a Structured Query Language (SQL) interface. The SQL interface has evolved into a standard language for RDBMS software and has been adopted as such by both the American National Standards Institute (ANSI) and the International Standards Organization (ISO).

A RDBMS uses relational techniques for storing and retrieving data in a relational database. Relational databases are computerized information storage and retrieval systems. Relational databases are organized into tables that consist of rows and columns of data. The rows may be called tuples or records or rows. A database typically has many tables, and each table typically has multiple records and multiple columns.

JAVA® Database Connectivity (JDBC™) may be described as a JAVA® Application Programming Interface (API) that enables JAVA® programs to dynamically execute SQL statements (JAVA and JDBC are trademarks of Oracle Corporation in the United States, other countries, or both). An IBM® DB2® system may be described as an RDBMS product that provides an ability to statically execute SQL statements (IBM and DB2 are trademarks of International Business Machines Corporation in the United States, other countries, or both).

Static execution of SQL statements provides performance advantages because such statements are prepared before runtime.

Additionally, static execution provides package level access authentication. A package may be described as a server side artifact that stores SQL information for static execution at the server computer. With static execution, users bind SQL statements in a package to statically execute the SQL statements. In a static execution model, a user who has the authority to access the base table will bind the packages and become the package owner. The package owner can then grant the ability to execute the package to a runtime environment authorization ID such as another userid in the data source definition. Because the authorization of the user binding the program is used, the end user does not require direct privileges to execute the statements in the package. In a static execution model, the authorization ID used at runtime is not required to have access to base tables. Instead of access to base tables, as in a dynamic JDBC™ implementation, the runtime authorization ID is given access to a specific predefined package and the inclusive SQL statements. This allows an improved security implementation since authorization IDs cannot change the SQL statements via programming logic. In addition if the authorization ID is used to connect via an alternate access mechanism due to a security breach, the authorization ID cannot execute any dynamic SQL. This also allows a strict auditing of all SQL statements which will be executed against a set of tables.

For example, a program may allow a user to update parts of a table without granting an update privilege on the entire table. This can be achieved by restricting the static SQL statements (i.e., SQL statements that are executed statically) to allow updates to certain columns or to a range of values.

SQLJ is an International Organization for Standardization (ISO) standard for embedding SQL in JAVA® programs. SQLJ may be described as supporting static SQL statements in JAVA® programs. However, users who want to use SQLJ have to learn SQLJ, which is a new, complicated language. If a user wants to run SQL statically, the user has to change existing JDBC™ programs into programs that use SQLJ syntax.

Thus, there is a need in the art for improved static execution of SQL statements in a JDBC™ program.

SUMMARY OF EMBODIMENTS OF THE INVENTION

Provided are a method, computer program product, and system for static execution of statements. Information from an execution file that describes statements that have been bound to a database during a previous execution of those statements dynamically and describes metadata about the statements is loaded. While executing a program that includes statements, for each of the statements, it is determined whether that statement is bound to the database. In response to determining that the statement is bound to the database, the statement is executed statically using the loaded information. In response to determining that the statement is not bound to the database, the statement is executed dynamically.

BRIEF DESCRIPTION OF THE DRAWINGS

Referring now to the drawings in which like reference numbers represent corresponding parts throughout:

FIGS. 5A, 5B, 5C, and 5D illustrate an example test case in accordance with certain embodiments.

FIGS. 6A, 6B, 6C, 6D, and 6E illustrate sample capture information in an eXtensible Markup Language (XML) file in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments provide a framework to enable users of programs (e.g., JDBC™ programs) with statements to statically execute the statements in the programs without making any changes to the existing programs. Embodiments are used to enable programs that do not execute statements statically to execute those statements statically. That is, in some programs, the statements are not executed statically, and embodiments convert such statements to be executed statically.

The statements may be SQL statements or other types of statements. Although, examples herein may refer to SQL statements, embodiments may be used with various types of statements (e.g., statements written in other languages, including XQuery, XPath, and XUpdate).

Figure 1:
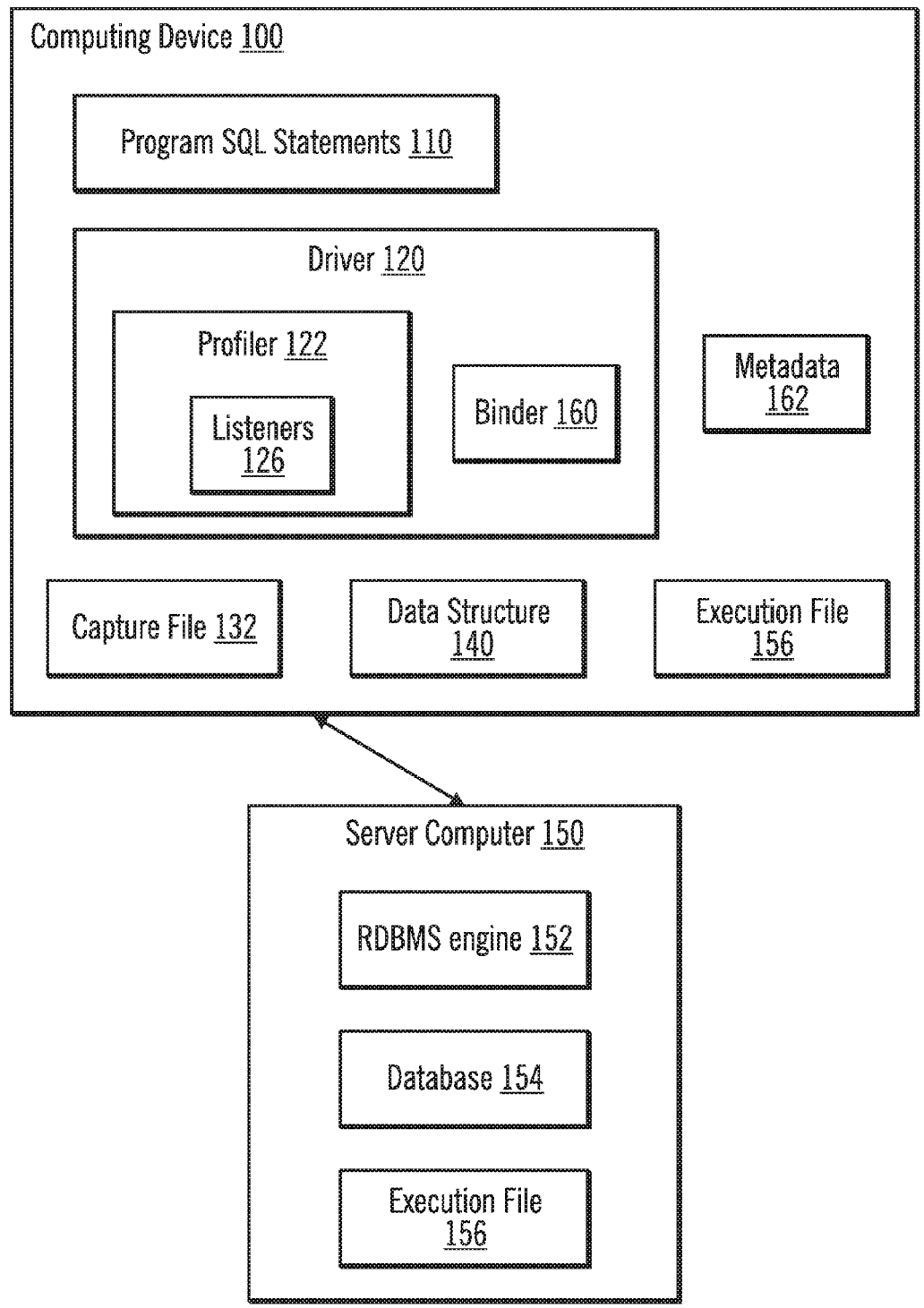
FIG. 1 illustrates details of a computing environment in accordance with certain embodiments.

FIG. 1 illustrates details of a computing environment in accordance with certain embodiments. A computing device 100 is connected to a data store. The computing device 100 may be a client or an application server.

The computing device 100 includes a program with statements 110 (also referred to as "program 110" for easy reference) and a driver 120. In certain embodiments, program 110 is a JDBC™ program with SQL statements. In certain embodiments, the driver 120 is a JDBC™ driver. The driver 120 provides a connection to a server computer 150 and implements a protocol for transferring a query to an RDBMS engine 152 and receiving a result from the RDBMS engine 152. The driver 120 includes a profiler 122. The profiler 122 outputs a capture file 132 that includes statements and metadata about the statements. The profiler 122 includes listeners 126 that are used to identify (e.g., intercept) statements that have been successfully executed.

The driver 120 also includes a binder 160 that is invoked to process and bind statements in a capture file 132. The binder 160 may be described as a tool that creates Bind artifacts in the database 154.

The computing device 100 also includes metadata 162 that is generated when a statement is prepared. The metadata includes, for example, column names, column types, column precision for decimal types, and a Coded Character Set Identifier (CCSID) (e.g., where the CCSID contains information used to assign and preserve the meaning and rendering of characters), etc.

In addition to the RDBMS engine 152, the server computer 150 includes database 154 and an execution file 156 (also referred to as an "execution file"). The execution file 156 is created from the capture file 132 and is output to the driver 120 for use in executing statements statically in the program 110. The execution file 156 includes a description of the statements that have been bound to the database 154 and metadata 162 about the statements.

In certain embodiments, the driver 120 receives the execution file 156 and loads the information contained in the execution file 156 into a data structure 140. In certain embodiments, the data structure 140 is a HashMap. A HashMap may be described as a look-up table that is designed to efficiently store key-value pairs.

The database 154 may be, for example, an array of storage devices, such as Direct Access Storage Devices (DASDs), Just a Bunch of Disks (JBOD), Redundant Array of Independent Disks (RAID), virtualization device, etc.

In order to allow programs to run statically (i.e., to execute statements statically) even though the programs were not developed to run statically, embodiments provide a three-phase approach. The three phases may be described as a capture phase that occurs during an execution of the program and generates a capture file 132, a processing and binding phase that generates a execution file 156 from the capture file 132, and an execution phase that executes the program 110 one or more additional times using the execution file 132 while additional statements are being captured. In certain embodiments, the capture phase may be further divided into a static capture phase and a dynamic capture phase.

The capture phase captures all statements in the program 110, and the capture phase is iterative (i.e., occurs with each execution of the program 110). The capture phase does not capture the same statement twice. The capture phase is iterative because all statements may not be captured during a particular execution of the program 110. In certain embodiments, the program 110 is executed multiple times with different conditions that exercise all the paths of the program 110 in order for all statements to be captured. Once the capture phase is over, the processing and binding phase binds the statements using the capture file 132 and writes relevant information back to the capture file 132.

Then, at runtime, the statements that were previously captured and bound are executed statically. In certain embodiments, there are dynamic statements (i.e., those that are constructed from user Input Strings) that can not be captured, and so the runtime framework provides a mixed mode execution in which these dynamic statements continue to execute dynamically as designed, while other statements execute statically.

Figure 2A:
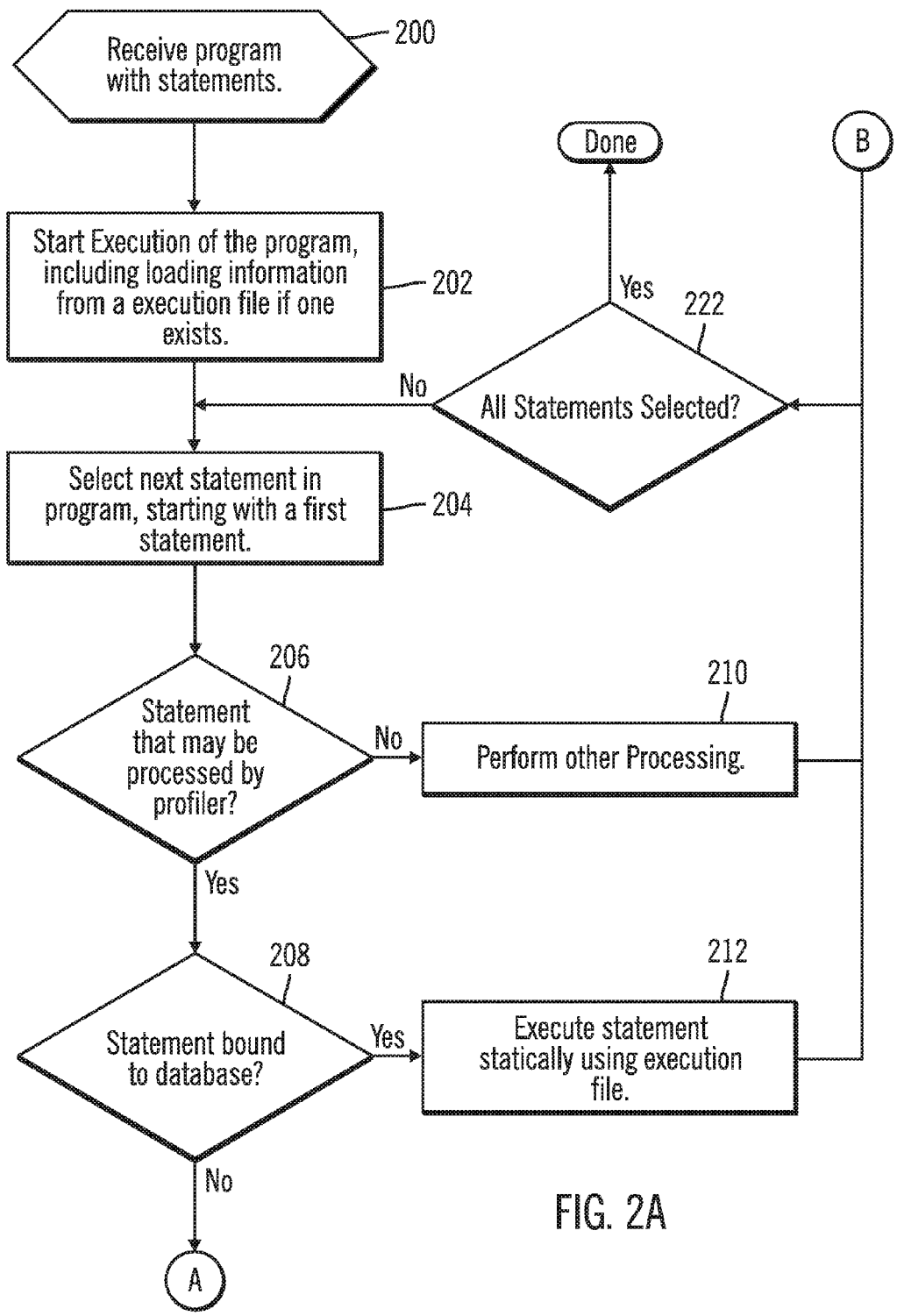
FIGS. 2A and 2B illustrate logic for executing a program in accordance with certain embodiments.
Figure 2B:
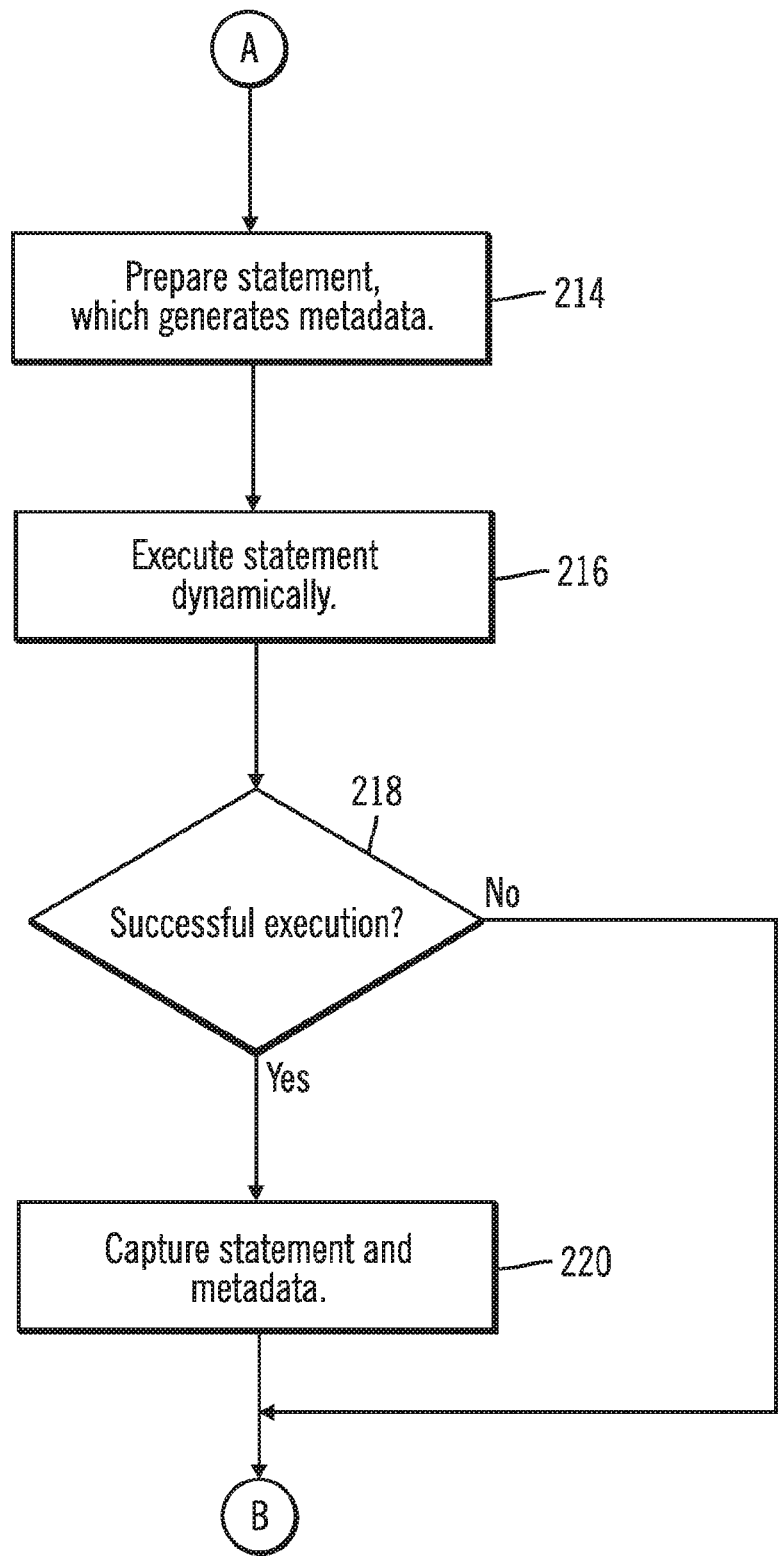

FIGS. 2A and 2B illustrate logic for executing a program in accordance with certain embodiments. Control begins at block 200 with the driver 120 receiving a program with statements 110. The program 110 may be a new program or an existing program.

In block 202, the driver 120 starts executing the program 110. In particular, if the driver 120 has received a execution file 156, which contains information about statements bound to the database 154 in the processing and binding phase, then, when the driver 120 is loaded (i.e., made available for execution), the driver 120 also loads the information in the execution file 156. In certain embodiments, the driver 120 loads the information contained in the execution file 156 into a data structure 140. The statements are used as keys in the data structure 140.

When a program 110 is executed for a first time, the execution file 156 has not been generated yet. The capture phase executes in parallel with the execution phase to capture data to be used in future executions of the program 110. Thus, once execution starts, the capture phase also starts.

In block 204, the driver 120 selects the next statement in the program 110, starting with a first statement. In block 206, the driver 120 determines whether the selected statement is a statement that may be processed by the profiler 122 (e.g., a SQL statement, XQuery statement, etc.). If so, processing continues to block 208, otherwise, processing continues to block 210.

In block 210, the driver 120 performs other processing and continues to block 222.

In block 208, the driver 120 determines whether the statement is bound to the database. If so, processing continues to block 212, otherwise processing continues to block 214 (FIB. 2B). In certain embodiments, the driver 120 makes the determination in block 208 by verifying that the statement is a key in the data structure 140.

In block 212, the driver 120 executes the statement statically using the execution file 156. In certain embodiments, if the driver 120 is able to find the key in the data structure 140, the driver 120 uses corresponding metadata information in the data structure 140 to execute the statement statically. From block 212, processing continues to block 222.

In block 214, if the driver 120 is not able to find a key in the data structure 140, the driver 120 prepares the statement. Preparing the statement generates metadata 162, such as column names, column types, column precision for decimal types, and a CCSID. In block 216, the driver 120 executes the prepared statement dynamically. Thus, if a statement has not been bound, then the statement is prepared before dynamic execution. On the other hand, statements that have been bound are executed statically using the metadata 162 generated when preparing the statements, which avoids the need for again preparing these statements.

In block 218, the driver 120 determines whether the statement executed successfully. If so, processing continues to block 220, otherwise, processing continues to block 222 (FIG. 2A).

In block 220, the profiler 122 captures the statement and corresponding metadata 162, which are written into the capture file 132. From block 220, processing continues to block 222.

Thus, while statements are begin executed, the profiler 122 starts a capture phase and creates a capture file 132 that stores information about statements and pertinent metadata 162 to enable the statements to be executed statically the next time those statements are encountered for execution.

In block 222 (FIG. 2A), the driver 120 determines whether all statements in the program 110 have been selected. If so, processing continues to block 204 to select a next statement, otherwise, processing is done.

Figure 3:
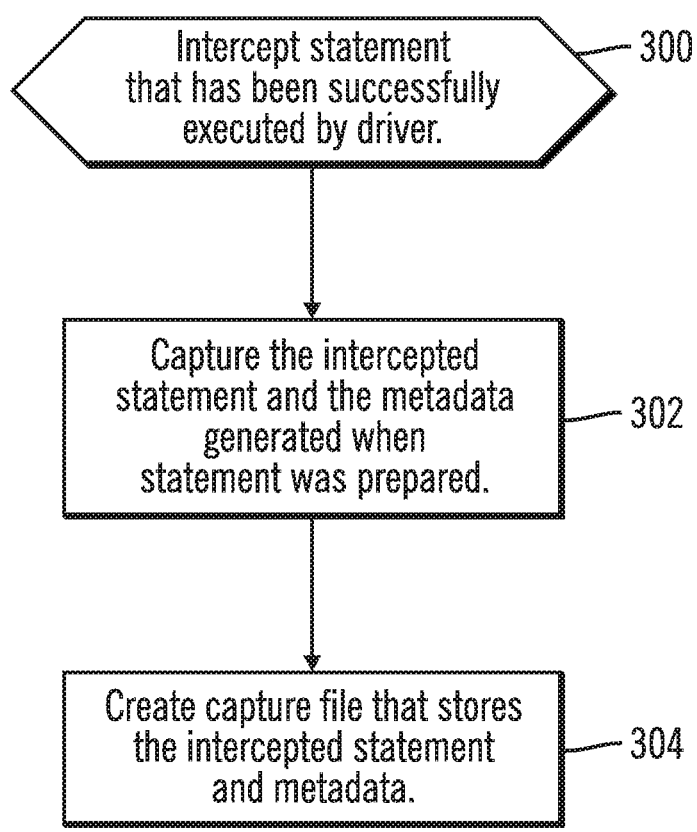
FIG. 3 illustrates logic performed by a profiler in the capture phase in accordance with certain embodiments.

FIG. 3 illustrates logic performed by the profiler 122 in the capture phase in accordance with certain embodiments. Some statements (e.g., ones that are created dynamically (e.g., by concatenating JAVA® Strings, which may be described as a type of alphanumeric character string)) are converted into a form for static execution. Control begins at block 300 with listeners 126 intercepting a statement that has been successfully executed by the driver 120. In block 302, the listeners 126 capture the intercepted statement and the metadata 162 that was generated when the statement was prepared (block 214). The metadata 162 is used to bind and run the statement statically. In block 304, the profiler 122 creates the capture file 132 (e.g., an XML file) that stores information about the intercepted statements and their pertinent metadata 162.

Figure 4:
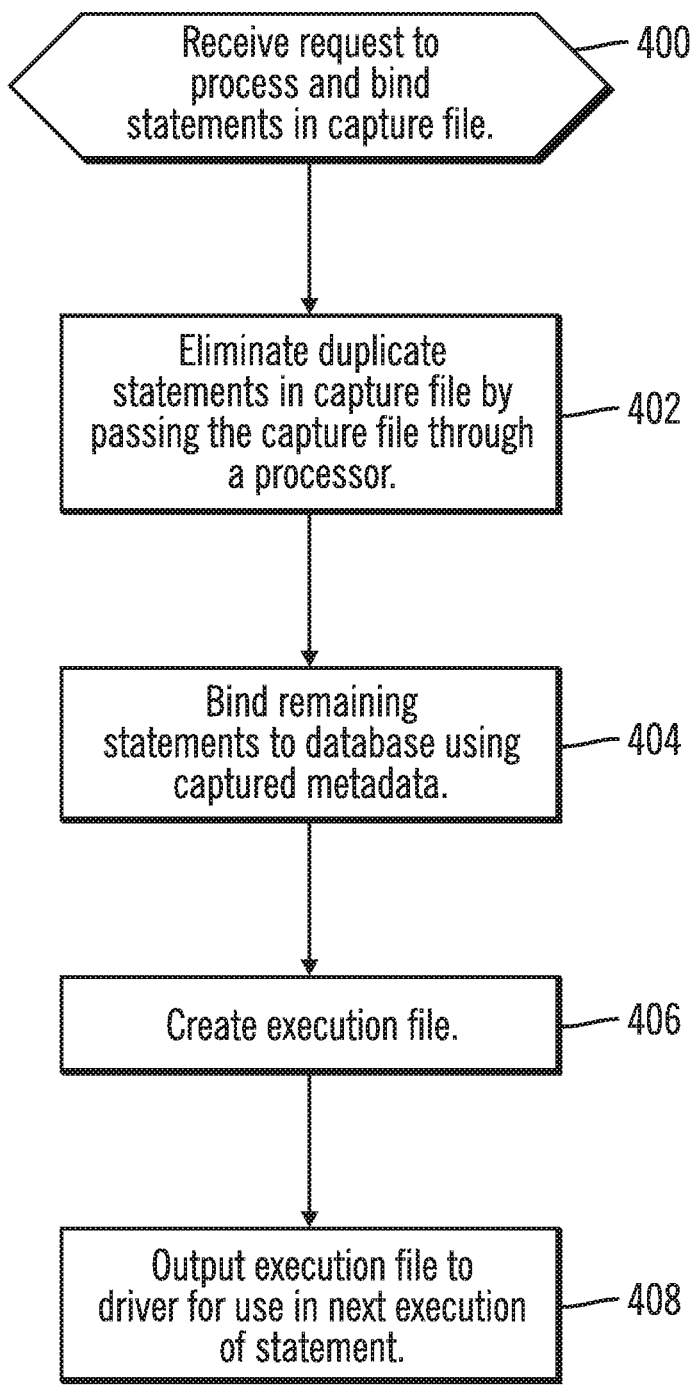
FIG. 4 illustrates logic performed by a binder in a processing and binding phase in accordance with certain embodiments.

FIG. 4 illustrates logic performed by the binder 160 in a processing and binding phase in accordance with certain embodiments. Control begins at block 400 with the binder 160 receiving a request to process and bind statements in a capture file 132. The request may be submitted by, for example, a system administrator or other user or by an application program. In block 402, the binder 160 eliminates duplicate statements in the capture file 132 by passing the capture file 132 through a processor. In block 404, the binder 160 binds the remaining statements (i.e., those not eliminated) to the database 154 using the captured metadata. In certain embodiments, in block 404, the binder 160 generates a plan for executing the statements, puts information into a database catalog for use in executing the statements, etc.

In block 406, the binder 160 creates a execution file 156 (e.g., an XML file) that stores information about these statements that are bound to the database 154. In block 408, the binder 160 forwards the execution file 156 to the driver 120. The driver 120 is able to use the execution file 156 to statically execute statements that have been bound to the database 154.

FIGS. 5A, 5B, 5C, and 5D illustrate an example program 500, 510, 520, 530 in accordance with certain embodiments. The example program connects to a database server "gilera.svl.ibm.com" (i.e., a database sample) and executes, for example, the following SQL statements:

INSERT INTO tab1 VALUES ....
UPDATE tab1 SET c1 = ? .... WHERE c1 = ?

-continued

DELETE FROM tab1 where c1 = 1
DELETE FROM tab1 . . . WHERE c1 =2
SELECT c1,c2,c3 FROM tab1 WHERE c1 > =1 and c1<=5
SELECT c1,c2,c3 FROM tab1 ... FOR UPDATE
UPDATE tab1 set c1 = ? .... WHERE CURRENT OF ...

The above SQL statements execute dynamically with a JDBC® driver. The capture phase captures the SQL statements along with metadata 162 after the SQL statements are successfully executed. The binder 160 then performs the bind and binds the SQL statements to the database 154. In addition, relevant information about the server computer 150 side packages are put back into the capture file 132. The SQL statements are now ready to be run statically, without any modification to the program.

FIGS. 6A, 6B, 6C, 6D, and 6E illustrate sample capture information in an XML file 600, 610, 620, 630, 640 in accordance with certain embodiments. The file name may reflect a server computer 150 and database 154 combination. Also, the XML file is input to the binder 160, which binds one statement at a time to a target server computer and database combination. The binder 160 also writes relevant information back to the capture file (e.g., package information, section information, consistency information, etc.). The capture file is used at runtime by the driver 120 to execute a statement statically.

In certain embodiments, the execution mode and/or capture mode are all controllable via user defined properties on the driver 120 (i.e., a capture mode indicator may be set to indicate that statements and metadata are to be captured when a program is being executed).

Thus, embodiments provide a static execution model in which an authorization identifier (ID) used at runtime is not required to have access to base tables. Instead of access to base tables (as in a dynamic execution model), the runtime authorization ID is given access to a specific pre-defined package and the inclusive statements. This allows an improved security implementation since authorization IDs cannot change the statements via programming logic. In addition if the authorization ID is used to connect via an alternate access mechanism due to a security breach, the authorization ID cannot execute any dynamic statements. This also allows a strict auditing of all statements which will be executed against a set of tables.

Embodiments eliminate runtime preparation of statement. That is, with embodiments providing static execution of statements, statement preparation occurs in advance of the runtime environment and occurs once. As a result, there is no repeated prepare activity for each transaction as with a dynamic execution model. This results in a reduction of CPU consumption at both the database server 150 where prepares occur and at the computing device 100 (e.g., application server) where a Prepared Statement object (i.e., that includes information about the prepared statement) is created.

Without the need to prepare each statement, embodiments remove the need to flow prepare activity across the network with each statement. This results in reduced network traffic/network flow and transaction elapsed time.

Embodiments provide strong data type enforcement. That is, static programs provide strict type enforcement for host variables passed as predicates into statements. This results in good development practices by ensuring that input data matches the target type within the database 154. Without a strict type enforcement of static SQL, such as in dynamic SQL, the developer is responsible to ensure the input data types match the target database column. In dynamic SQL, failure to comply can result in the inability to use an index and change the access path.

Embodiments enable predictable access path selection for static statements. Since prepares are performed in advance and do not repeatedly occur at runtime, access paths do not change as the result of running statistics (e.g., to perform database maintenance) or variation in the data attributes. This implies that a tested program has repeatable execution without the potential to significantly change access paths as the result of data changes or database maintenance that may affect access path selection.

In addition, with embodiments, a user does not need to learn a new, complicated language. Moreover, with embodiments, users do not need to make any changes to existing programs (e.g., those written in JAVA® using JDBC™).

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2A, 2B, 3, and 4 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2A, 2B, 3, and 4 may be implemented in software, hardware, programmable and non-programmable gate array logic or in some combination of hardware, software, or gate array logic.

Figure 7:
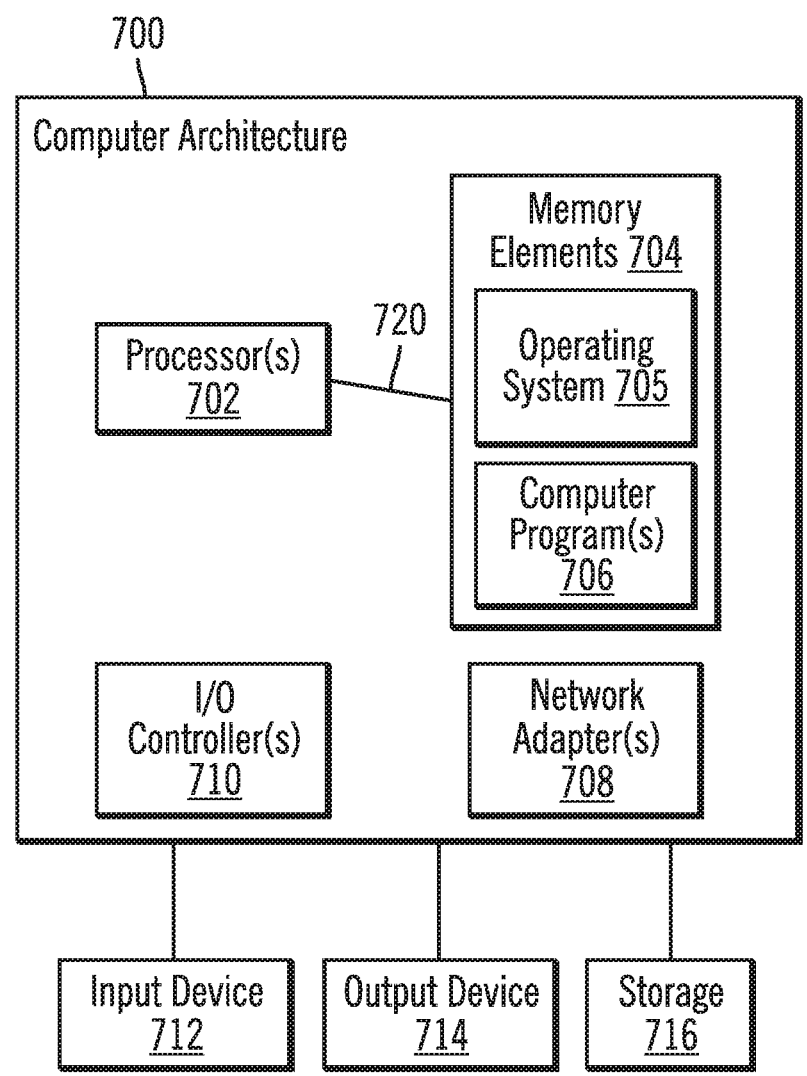
FIG. 7 illustrates a system architecture that may be used in accordance with certain embodiments.

FIG. 7 illustrates a system architecture 700 that may be used in accordance with certain embodiments. Client computer 100 and/or server computer 120 may implement system architecture 700. The system architecture 700 is suitable for storing and/or executing program code and includes at least one processor 702 coupled directly or indirectly to memory elements 704 through a system bus 720. The memory elements 704 may include local memory employed during actual execution of the program code, bulk storage, and cache memories which provide temporary storage of at least some program code in order to reduce the number of times code must be retrieved from bulk storage during execution. The memory elements 704 include an operating system 705 and one or more computer programs 706.

Input/Output (I/O) devices 712, 714 (including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The system architecture 700 may be coupled to storage 716 (e.g., a non-volatile storage area, such as magnetic disk drives, optical disk drives, a tape drive, etc.). The storage 716 may comprise an internal storage device or an attached or network accessible storage. Computer programs 706 in storage 716 may be loaded into the memory elements 704 and executed by a processor 702 in a manner known in the art.

The system architecture 700 may include fewer components than illustrated, additional components not illustrated herein, or some combination of the components illustrated and additional components. The system architecture 700 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method, comprising:
during a first execution of a statement from statements in a program that is executed against a database,
preparing the statement to generate metadata; and
dynamically executing the statement; and
during a second execution of the statement,
in response to determining that the statement is bound to the database,
loading information from an execution file that describes the statement that was dynamically executed and that describes the metadata for the statement; and
statically executing the statement that was dynamically executed during the first execution using the loaded information and an authorization identifier (ID) that does not have access to base tables in the database; and
in response to determining that the statement is not bound to the database, executing the statement dynamically using an authorization ID that has access to base tables in the database.

2. The method of claim 1, wherein the program comprises Structured Query Language (SQL) statements.

3. The method of claim 1, further comprising:
during the first execution,
determining whether the statement executed successfully; and
in response to determining that the statement executed successfully, capturing the statement and the generated metadata.

4. The method of claim 3, further comprising:
intercepting the statement that has been successfully executed; and
creating a capture file that stores the statement and the generated metadata.

5. The method of claim 4, further comprising:
eliminating duplicate statements in the capture file;
binding statements remaining in the capture file to the database; and
outputting information about bound statements and the metadata about the bound statements in the execution file.

6. The method of claim 1, further comprising:
loading the information in the execution file into a data structure, wherein each of the statements is a key into the data structure.

7. A computer program product comprising a storage device storing a computer readable program, wherein the computer readable program, when executed by a processor on a computer, causes the computer to:
during a first execution of a statement from statements in a program that is executed against a database,
prepare the statement to generate metadata; and
dynamically execute the statement; and
during a second execution of the statement,
in response to determining that the statement is bound to the database,
load information from an execution file that describes the statement that was dynamically executed and that describes the metadata for the statement; and
statically execute the statement that was dynamically executed during the first execution using the loaded information and an authorization identifier (ID) that does not have access to base tables in the database; and
in response to determining that the statement is not bound to the database, execute the statement dynamically using an authorization ID that has access to base tables in the database.

8. The computer program product of claim 7, wherein the program comprises Structured Query Language (SQL) statements.

9. The computer program product of claim 7, wherein the computer readable program when executed on a computer causes the computer to:
during the first execution,
determine whether the statement executed successfully; and
in response to determining that the statement executed successfully, capture the statement and the generated metadata.

10. The computer program product of claim 9, wherein the computer readable program when executed on a computer causes the computer to:
intercept the statement that has been successfully executed; and
create a capture file that stores the statement and the generated metadata.

11. The computer program product of claim 10, wherein the computer readable program when executed on a computer causes the computer to:
eliminate duplicate statements in the capture file;
bind statements remaining in the capture file to the database; and
output information about bound statements and the metadata about the bound statements in the execution file.

12. The computer program product of claim 7, wherein the computer readable program when executed on a computer causes the computer to:
load the information in the execution file into a data structure, wherein each of the statements is a key into the data structure.

13. A system, comprising:
a processor;
a storage device storing a computer program; and
wherein the computer program is executed by the processor to perform operations, the operations comprising:
   during a first execution of a statement from statements in a program that is executed against a database,
      preparing the statement to generate metadata; and
      dynamically executing the statement; and
   during a second execution of the statement,
      in response to determining that the statement is bound to the database,
         loading information from an execution file that describes the statement that was dynamically executed and that describes the metadata for the statement; and
         statically executing the statement that was dynamically executed during the first execution using the loaded information and an authorization identifier (ID) that does not have access to base tables in the database; and
      in response to determining that the statement is not bound to the database, executing the statement dynamically using an authorization ID that has access to base tables in the database.

14. The system of claim 13, wherein the program comprises Structured Query Language (SQL) statements.

15. The system of claim 13, wherein the operations further comprise:
   during the first execution,
      determining whether the statement executed successfully; and
      in response to determining that the statement executed successfully, capturing the statement and the generated metadata.

16. The system of claim 15, wherein the operations further comprise:
   intercepting the statement that has been successfully executed; and
   creating a capture file that stores the statement and the generated metadata.

17. The system of claim 16, wherein the operations further comprise:
   eliminating duplicate statements in the capture file;
   binding statements remaining in the capture file to the database; and
   outputting information about bound statements and the metadata about the bound statements in the execution file.

18. The system of claim 13, wherein the operations further comprise:
   loading the information in the execution file into a data structure, wherein each of the statements is a key into the data structure.

* * * * *